United States Patent [19]

Wolff

[11] Patent Number: 5,528,017
[45] Date of Patent: Jun. 18, 1996

[54] ELECTRONIC THERMOSTAT FOR AN OVEN

[75] Inventor: David A. Wolff, St. Charles, Ill.

[73] Assignee: Robertshaw Controls Company, Richmond, Va.

[21] Appl. No.: 316,207

[22] Filed: Sep. 30, 1994

[51] Int. Cl.[6] ................................................. H05B 1/02
[52] U.S. Cl. ..................... 219/501; 219/413; 219/497; 219/505; 219/481
[58] Field of Search .................................. 219/494, 488, 219/481, 505, 504, 501, 497, 499, 411–413; 307/117

[56] References Cited

U.S. PATENT DOCUMENTS

| | | | |
|---|---|---|---|
| 3,903,395 | 9/1975 | Hamstra | 219/494 |
| 4,114,024 | 9/1978 | Donner | 219/489 |
| 4,314,143 | 2/1982 | Bilstad et al. | 219/497 |
| 4,504,733 | 3/1985 | Walsh | 219/521 |
| 4,687,163 | 8/1987 | Ringer | 219/511 |
| 4,744,359 | 5/1988 | Hatta et al. | 219/501 |
| 5,345,064 | 9/1994 | Hesse | 219/505 |

*Primary Examiner*—Mark H. Paschall
*Attorney, Agent, or Firm*—Robert J. Black

[57] ABSTRACT

An electronic thermostat for use with cooking ovens that may include oven cleaning features. An analog comparator is utilized to compare reference voltage with voltage representative temperature changes sensed within the oven, to control the oven heating element.

14 Claims, 1 Drawing Sheet

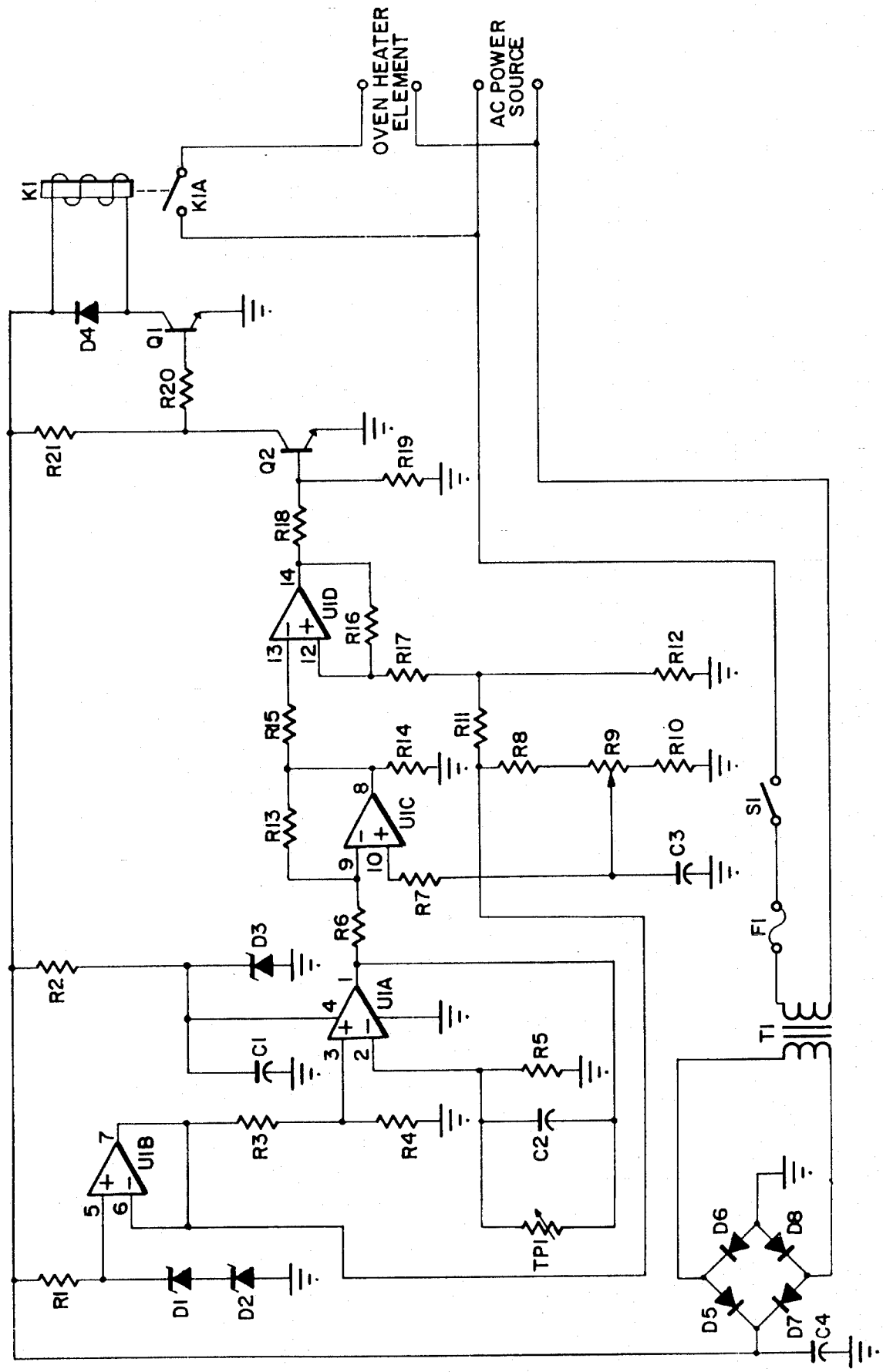

ELECTRONIC THERMOSTAT FOR AN OVEN

BACKGROUND OF THE INVENTION

1. Field of the Invention

The present invention relates to a thermostat for use with an oven and more particularly for an electronic thermostat for use with an oven that may include a self-cleaning feature.

2. Background Art

The majority of cooking ovens in the present state of the art utilize electro-mechanical devices as thermostats to sense and subsequently control oven cavity temperature. Most of these units utilize a capillary tube device to sense oven cavity temperature wherein the expanding liquid in the system expands a diaphragm when hot and controls a switch to turn the heating elements on or off. Usually in such an arrangement, temperature swings are not tightly controlled and the control is accurate only at such time as when initially calibrated.

It has been determined by means of field service data, reliability of such mechanical devices is not as good as expected by the stove and oven industry. It has long been felt that by means of electronic circuitry, a substantial improvement can be made in accuracy, control and reliability over mechanical thermostats as described above. A certain amount of electronic controls have been developed in the field of oven temperature regulation. It is noted that many of these utilize keyboards or rotary encoders for input and electronic displays for user feedback. Such techniques utilize calibrated knobs similar to that of the mechanical counterpart. The consumer is unable to determine from the controls as presented that electronic circuitry is utilized in such arrangements.

Other techniques employed in the area of oven thermostats include the use of a bi-metallic sensing element that operates to close or open an electrical contact to control a circuit to an electronic heating oven or in the case of a gas fired unit the bi-metallic element may be employed to control a movable valve member for controlling fuel control to the burner in response to the sensed oven temperature. Yet another technique includes the use of a bi-metallic element heated by an electrical current in response to a thermistor in the oven for sensing oven temperature. The bi-metallic element mechanically operates the fuel gas valve and electrical relay for energizing or deenergizing the appropriate fuel valve.

A background art search directed to the subject matter of this application and conducted in the U.S. Patent and Trademark Office disclosed the following U.S. Pat. Nos.:

4,493,980
4,524,264
4,948,950
4,958,062
5,040,724
5,053,605
5,126,536
5,256,860

None of the above patents disclosed an oven temperature regulating electronic thermostat which effectively senses the oven cavity temperature including a linear potentiometer set to cook and clean temperatures. In the present arrangement, voltage is generated to control a relay to cycle the heating element to maintain the oven cavity temperature. It is also usable in both gas or electric cooking ovens, even those which may include a self-cleaning feature to control both the cook and clean temperatures.

SUMMARY OF THE INVENTION

The circuitry of the present invention includes electronic control means for an oven heating unit utilizing electronic means for generating control of signals in response to oven temperature sensed. The oven temperature sensed is compared with a reference signal established by the user by means of a conventional rotary linear potentiometer, i.e., variable resistance. The present invention elementally includes a reference voltage source, a constant current source, a high gain amplifier and an analog output comparator that includes hysteresis. It also includes a relay driver to drive or control the heating elements. Various safety circuits are included to guard against thermal runaway conditions which could cause difficulty.

Initially a reference source is generated across a zero compensated reference such as a zener diode or a band gap reference. To guarantee constant loading of the reference source, an operational amplifier configured as a voltage follower functions as a buffer to the output. This reference source is utilized extensively throughout the circuit wherever voltages need to be compared. Comparing voltages with such a constant voltage source ensures that the reference drift and all comparative voltages will also drift ratiometrically, thus enabling the accuracy of the temperature set point to be maintained.

The constant current source is used to detect the oven temperature. Voltage derived from the reference is generated by a resistive divider and applied to the positive input of the operational amplifier. The negative input of the operational amplifier includes a fixed resistor to ground and a thermistor to the output. Since the voltage at the negative terminal has to equal the positive terminal and since the bias is derived from the thermistor element, constant current is thus established through the thermistor. Therefore, as the value of the thermistor probe changes with temperature, the output voltage of the probe amplifier also changes.

The output from the probe circuit is then extended to the negative input of a high gain operational amplifier stage. Positive input bias to the stage is set by voltage on the wiper of the temperature establishing linear potentiometer by the user. Since the gain is very high, only a portion of the probe voltage that is near the bias point of the positive input of the operational amplifier will cause a linear output. The rest of the range being at B+ or at ground. Thus, this stage can be seen as taking only a slice of the probe output around the temperature set point, thus substantially increasing the sensitivity of the probe utilized. Output from the slicer amplifier is then fed to a comparator stage that includes hysteresis. The amount of hysteresis is initially adjusted by the value of the positive feedback resistor. This stage provides the system with substantial noise immunity. The stage is also buffered by relay driver transistors at its output. Actual feedback for the entire system is the oven cavity which depends on its size, the wattage of the heater element included therein, and placement of the temperature probe. Because of this, gain from the slicer amplifier and the value of hysteresis need to be determined for different ovens. In a test oven, it was determined that about ±18° F. variation was found around the set point.

BRIEF DESCRIPTION OF THE DRAWING

A better understanding of the present invention may be had from consideration of the following detailed description taken in conjunction with the accompanying drawing in which:

The single FIGURE is a schematic diagram of an electronic thermostat in accordance with the present invention.

DESCRIPTION OF THE PREFERRED EMBODIMENT

Referring now to the drawing, the voltage reference source of the present invention is made up of micro-circuit operational amplifier U1B, resistor R1, and diodes D1 and D2. It is noted that resistor R1 is a dropping resistor used to supply zener diodes D1 and D2. The particular zener diodes employed are 5.1 volt zeners selected inasmuch as they exhibit a zero temperature compensation characteristic. The voltage developed across the zeners is then applied to the positive input of operational amplifier U1B which is configured as a voltage follower. The output 7 of U1B is a 10.2 volt reference voltage and as such is utilized throughout the circuitry of the present invention.

Operational amplifier microcircuit U1A is the probe amplifier. Reference voltage is divided down by resistors R3 and R4 configured as a divider to about 3.25 volts and thus applied to positive input 3 of amplifier U1A. In the steady state, there must also be 3.25 volts at the negative input, which is developed across resistor R5. This bias is applied from the output of U1A through the variable resistance TP1 which functions as the temperature probe. Established across the probe also is capacitor C2 which functions as a noise filter. Since resistor R5 is a fixed resistor, the output voltage of amplifier U1A changes as the value of the temperature probe resistor TP1 changes to maintain control current in resistor R5. Since the output is:

$$Vout = Vdiv * ((R5 + RTD))/(R5)$$

As can be seen, the output from U1A coupled to the negative input of amplifier U1C provided a very high gain (in the present embodiment being approximately 40 to 47). Since the output swing is limited to B+ and ground, it is obvious that only a portion of probe voltage will be able to be amplified. Bias on the positive probe will determine what portion of the probe voltage is amplified. Thus this bias then is what determines the temperature set point of the thermostat. Resistors R6 and R13 determine the gain of the microcircuit amplifier U1C. Resistor R7 is used to balance the offset current of the operational amplifier U1C. Resistors R8, R9 and R10 are utilized to set the range of adjustment period. It should be noted that resistor R9 is variable, utilizing a linear rotary potentiometer so that the control presents an appearance to the consumer or user that is similar to most conventional thermostat controls on prior art cooking ovens. Capacitor C3 is utilized to function as a noise filter.

The final microcircuit operational amplifier U1D functions as a comparator with an amount of hysteresis. In the arrangement as shown, resistors R11 and R12 set the comparison voltage to the positive input of amplifier U1D while resistors R16 and R17 provide the positive feedback required for hysteresis. In this case, about ±0.75 volts. This stage, effectively provides two functions. First, it further narrows a control range to about ±18° F. and secondly, it provides a certain amount of noise immunity at the switch point due to the positive feedback.

Transistors Q1 and Q2 are the relay drivers. The relay K1 at its contact K1A switches the heating elements on or off to maintain oven temperature.

It can be seen the oven cavity will effectively provide the overall system feedback from the heater element to the temperature probe TP1. While not shown in the present circuit, it is possible to add additional operational amplifiers as comparators to sense fault conditions and provide an effective safety shutdown of the heating element of the oven under improper conditions.

While but a single embodiment of the present invention has been shown, it will be obvious to those skilled in the art that numerous modifications may be made without departing from the spirit of the present invention which shall be limited only by scope of the claims appended hereto.

What is claimed is:

1. An electronic thermostat circuit for controlling the heating element of an oven, said circuit comprising:

a voltage reference source, including a pair of zener diodes serially connected to a resistor, connected to an input of an operational amplifier, said operational amplifier functioning as a voltage follower;

a remote temperature sensing probe located in said oven, operated to change value in response to temperature changes in said oven;

a probe amplifier including a first input connected to said voltage reference source;

said probe amplifier further including a second input connected to said remote temperature sensing probe;

said probe amplifier generating an output voltage in response to changes in said remote temperature sensing probe value, occurring in response to temperature changes sensed within said oven;

said probe amplifier output voltage maintaining a constant current;

said output voltage for said probe amplifier applied to one of the inputs of a high gain amplifier;

said high gain amplifier operated in response to only a portion of the output voltage of said probe amplifier;

output of said high gain amplifier connected to a first input of an analog comparator stage;

a second input of said analog comparator stage connected to set point control means;

said analog comparator stage, including an operational amplifier;

said analog comparator stage further including a pair of resistors providing positive feedback establishing hysteresis in said analog comparator stage;

said set point control means manually operated to establish a temperature set point for operation of said oven;

relay driver means connected to a relay;

said analog comparator stage operated in response to an output from said high gain stage, being different than said set point, to control said relay driver;

said relay driver means operated in response to said analog comparator stage to cause said relay to control the oven heating element of said oven.

2. An electronic thermostat circuit as claimed in claim 1 wherein:

said analog comparator stage is operated in response to an output from said high gain stage being greater than said set point to render said relay driver inoperative.

3. An electronic thermostat circuit as claimed in claim 2 wherein:

said relay driver is rendered inoperative in response to said analog comparator to render said oven heating element inoperative.

4. An electronic thermostat circuit as claimed in claim 1 wherein:

said analog comparator stage is operated in response to an output from said high gain stage being less than said set point to render said relay driver operative.

5. An electronic thermostat circuit as claimed in claim 4 wherein:

said relay driver in response to being rendered operative in response to said analog comparator to cause said relay to operate to render the oven heating element of said oven operated.

6. An electronic thermostat circuit as claimed in claim 1 wherein:

said remote temperature sensing probe is a varistor.

7. An electronic thermostat circuit as claimed in claim 1 wherein:

said probe amplifier includes connections from said voltage reference source and from said remote temperature sensing probe and a fixed resistor in parallel connected to said amplifier to maintain a constant current with changing voltage from said remote temperature sensing probe.

8. An electronic thermostat circuit as claimed in claim 1 wherein:

said probe amplifier has an output swing limited to the voltage difference between the B+ potential and ground whereby only a portion of the probe voltage is amplified.

9. An electronic thermostat circuit as claimed in claim 1 wherein:

said hysteresis of said analog comparator stage is in a range between 0.5 volt and 1.0 volt.

10. An electronic thermostat circuit as claimed in claim 1 wherein:

said temperature control range for said analog comparator stage is in a range between 15° F. and 21° F.

11. An electronic thermostat circuit as claimed in claim 1 wherein:

said set point control means comprise a manually adjustable resistance.

12. An electronic thermostat circuit as claimed in claim 11 wherein:

said manually adjustable resistance is a linear potentiometer.

13. An electronic thermostat circuit as claimed in claim 1 wherein:

said relay driver means comprise first and second transistors connected in series between said analog comparator stage and said relay.

14. An electronic thermostat circuit as claimed in claim 1 wherein:

said relay includes output circuit connections to the heating element of said oven.

* * * * *